United States Patent [19]
Knight

[11] Patent Number: 5,881,042
[45] Date of Patent: Mar. 9, 1999

[54] FLYING HEAD WITH SOLID IMMERSION LENS PARTIALLY MOUNTED ON A SLIDER

[75] Inventor: Gordon R. Knight, Saratogo, Calif.

[73] Assignee: Terastor Corporation, San Jose, Calif.

[21] Appl. No.: 926,907

[22] Filed: Sep. 10, 1997

Related U.S. Application Data

[63] Continuation of Ser. No. 641,513, May 1, 1996, abandoned.
[51] Int. Cl.$^6$ ........................................ G11B 7/00
[52] U.S. Cl. ............... 369/99; 369/44.14; 369/44.23; 369/112; 369/119
[58] Field of Search ................ 369/99, 44.23, 369/44.14, 44.32, 112, 119; 159/664

[56] References Cited

U.S. PATENT DOCUMENTS

| | | | |
|---|---|---|---|
| 4,633,450 | 12/1986 | Gueugnon | 369/13 |
| 4,753,521 | 6/1988 | Deserno | 359/663 |
| 4,965,780 | 10/1990 | Lee et al. | 369/13 |
| 4,987,292 | 1/1991 | Howard | 250/201.5 |
| 5,004,307 | 4/1991 | Kino et al. | 350/1.2 |
| 5,020,040 | 5/1991 | Lee | 369/13 |
| 5,105,408 | 4/1992 | Lee et al. | 369/44.15 |
| 5,112,662 | 5/1992 | Ng | 428/64 |
| 5,115,363 | 5/1992 | Khan et al. | 360/104 |
| 5,120,603 | 6/1992 | Schmidt | 428/336 |
| 5,121,256 | 6/1992 | Corle et al. | 359/356 |
| 5,125,750 | 6/1992 | Corle et al. | 369/43 |
| 5,128,216 | 7/1992 | Ng | 428/695 |
| 5,153,870 | 10/1992 | Lee et al. | 369/111 |
| 5,161,134 | 11/1992 | Lee | 369/13 |
| 5,182,444 | 1/1993 | Howard | 250/201.5 |
| 5,191,563 | 3/1993 | Lee et al. | 369/13 |
| 5,197,050 | 3/1993 | Murakami et al. | 369/13 |
| 5,202,880 | 4/1993 | Lee et al. | 369/275.4 |
| 5,223,710 | 6/1993 | Pavlak | 250/230 |
| 5,232,570 | 8/1993 | Haines et al. | 204/192.16 |
| 5,243,241 | 9/1993 | Wang | 310/36 |
| 5,247,510 | 9/1993 | Lee et al. | 369/118 |

(List continued on next page.)

OTHER PUBLICATIONS

Maeda, Fumisada, et al., "High Density Optical Disk System Using a New Two–Element Lens and a Thin Substrate Disk", Research Center, Sony Corporation, pp. 342–344.

Betzig, E., et al., "Near–field magneto–optics and high density data storage", *Appl. Phys. Lett.*, vol. 61, No. 2, pp. 142–144, Jul. 13, 1992.

Maeda, F., et al., "High density optical disk system using a new two–element lens and a thin substrate disk", *Technical Digest, 1996 International Symposium on Optical Memory and Optical Data Storage*, pp. 342–344, 1996.

Mansfield, S., et al., "High–numerical–aperture lens system for optical storage", *Optics Letters*, vol. 18, No. 4, pp. 305–307, Feb. 15, 1993.

Mansfield, S., et al., "Solid immersion microscope", *Appl. Phys. Lett.*, vol. 57, No. 24, pp. 2615–2616, Dec. 10, 1990.

Yamamoto, K., et al., "A 0.8 Numerical Aperture Two Element Objective Lens for the Optical Disk", *Technical Digest, 1996 International Symposium on Optical Memory and Optical Data Storage*, pp. 345–347, 1996.

G.S. Kino, "High Density Storage with a Solid Immersion Lens", *Ginzton laboratory, Stanford University*.

Hayashi, S., et al., "Solid Immersion Lens for Optical Storage," Stanford University, G.L. Report No. 5258, Feb. 1995 (9 page document).

(List continued on next page.)

*Primary Examiner*—Eddie P. Chan
*Assistant Examiner*—Kim-Kwok Chu
*Attorney, Agent, or Firm*—Fish & Richardson P.C.

[57] ABSTRACT

A head for a disk drive for reading data from and/or writing data to an optical recording medium, having a slider with a channel surface and an air-bearing surface, an optical clear path through the slider, a solid immersion lens mounted at least partially within the slider, and an objective lens mounted to the slider, such that the distances between the air-bearing surface, the objective, and the solid immersion lens are substantially constant.

45 Claims, 6 Drawing Sheets

U.S. PATENT DOCUMENTS

| | | | |
|---|---|---|---|
| 5,255,260 | 10/1993 | Yamada et al. | 369/199 |
| 5,260,928 | 11/1993 | Lee et al. | 369/112 |
| 5,288,997 | 2/1994 | Betzig et al. | 359/368 |
| 5,295,122 | 3/1994 | Murakami et al. | 369/13 |
| 5,307,336 | 4/1994 | Lee et al. | 369/112 |
| 5,381,402 | 1/1995 | Lee et al. | 369/291 |
| 5,432,763 | 7/1995 | Campbell et al. | 369/44 |
| 5,445,011 | 8/1995 | Ghislain et al. | 250/306 |
| 5,452,283 | 9/1995 | Lee et al. | 369/112 |
| 5,467,238 | 11/1995 | Lee et al. | 360/128 |
| 5,470,627 | 11/1995 | Lee et al. | 428/64.4 |
| 5,486,970 | 1/1996 | Lee et al. | 360/128 |
| 5,497,359 | 3/1996 | Mamin et al. | 369/44.15 |
| 5,504,731 | 4/1996 | Lee et al. | 369/112 |
| 5,541,888 | 7/1996 | Russell | 369/112 |
| 5,602,819 | 2/1997 | Inagaki et al. | 369/112 |
| 5,602,820 | 2/1997 | Wickramasinghe et al. | 369/126 |

OTHER PUBLICATIONS

Ichimura, Isao, et al., "High Density Optical Recording Using a Solid Immersion Lens," Stanford University, G.L. Report No. 5371, Nov. 1995, pp. 1–22 and Figs. 1–17.

Mamin, H.J., et al., "High density optical recording with a flying solid immersion lens," presented at the Optical Data Storage Conference in San Diego, California in May, 1995, pp. 1–2.

Terris, B.D., et al., "Near–field optical data storage using a solid immersion lens," *Applied Physics Letters,* 65 (4), Jul. 25, 1994, pp. 388–390.

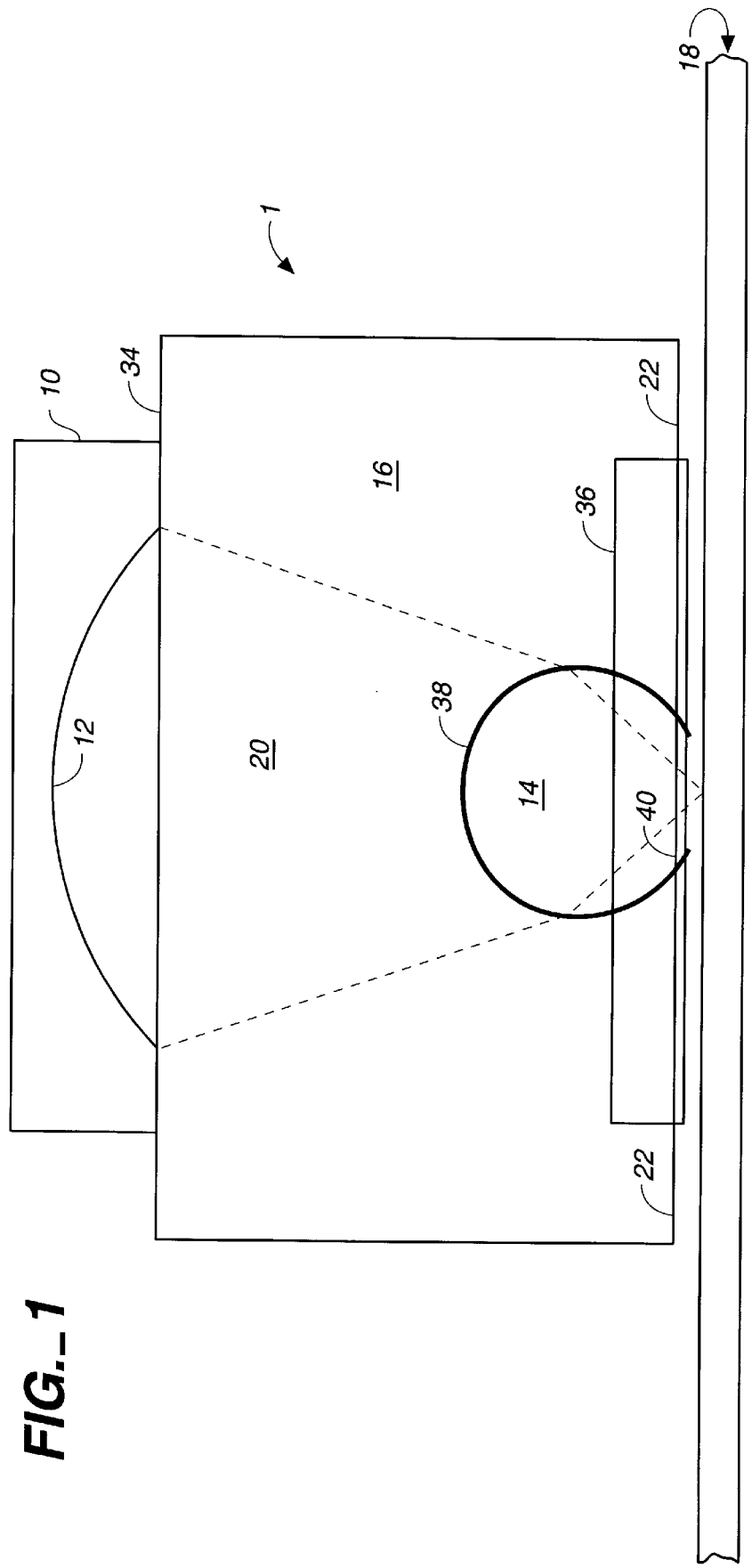
FIG._1

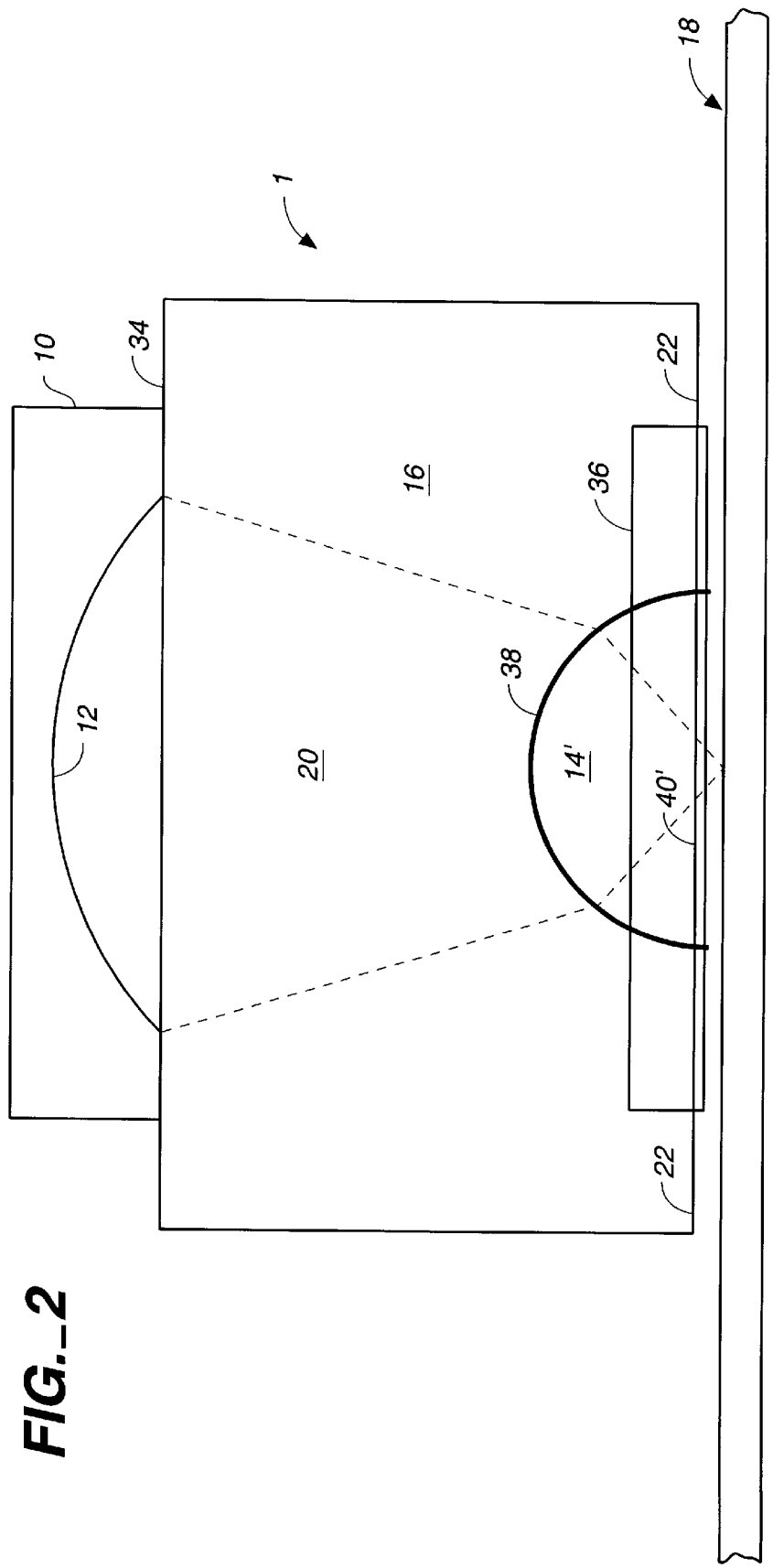
FIG._2

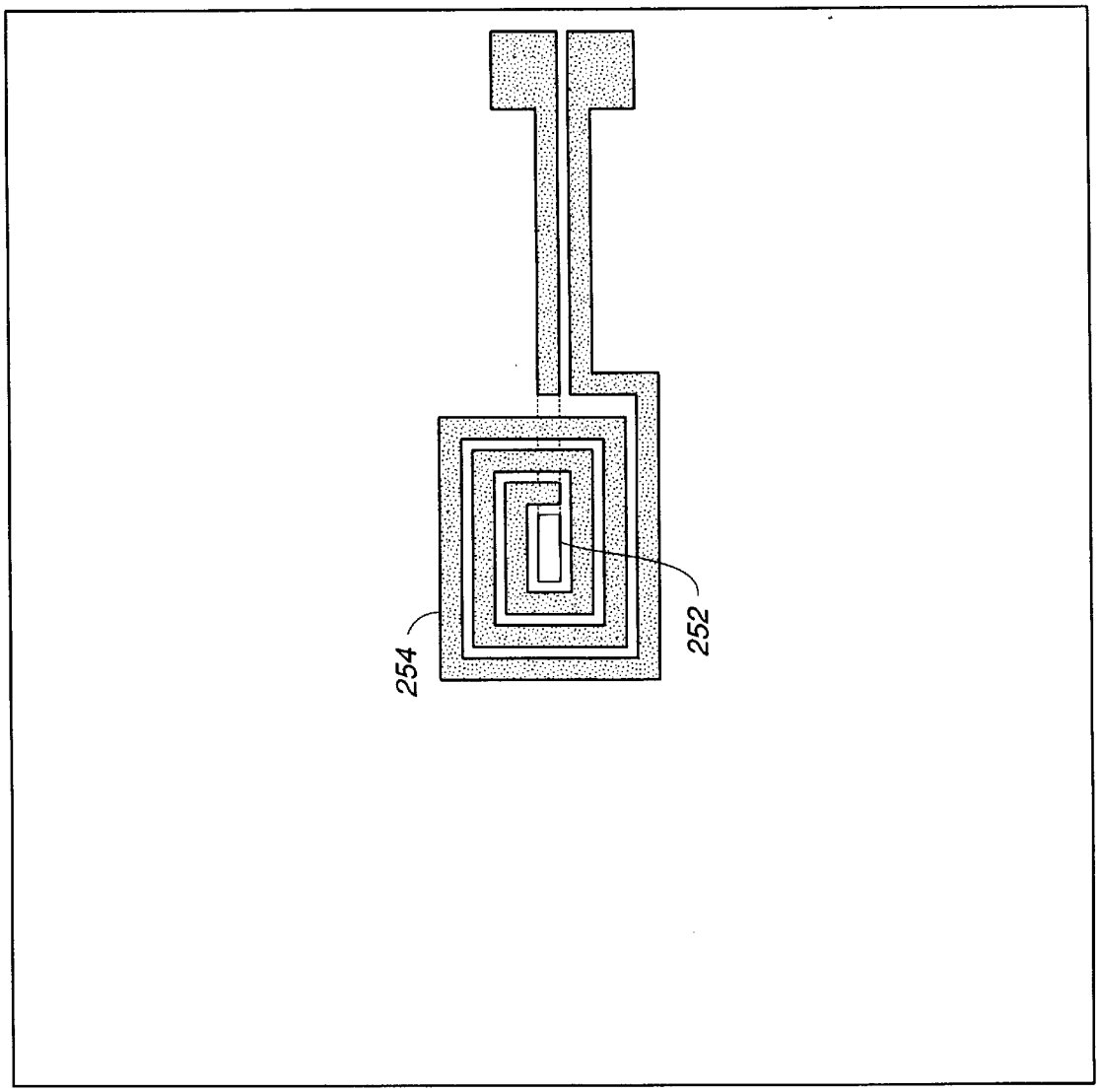
FIG._7
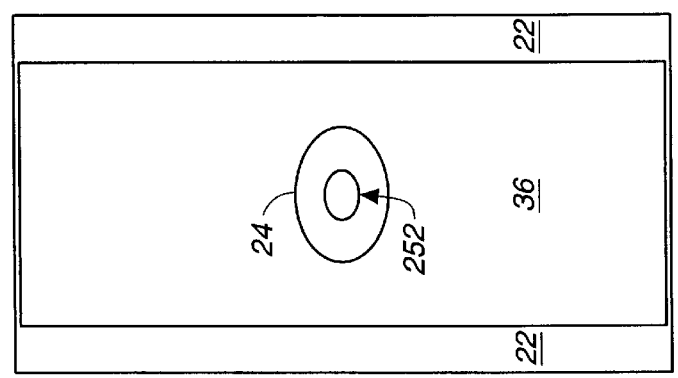
FIG._3

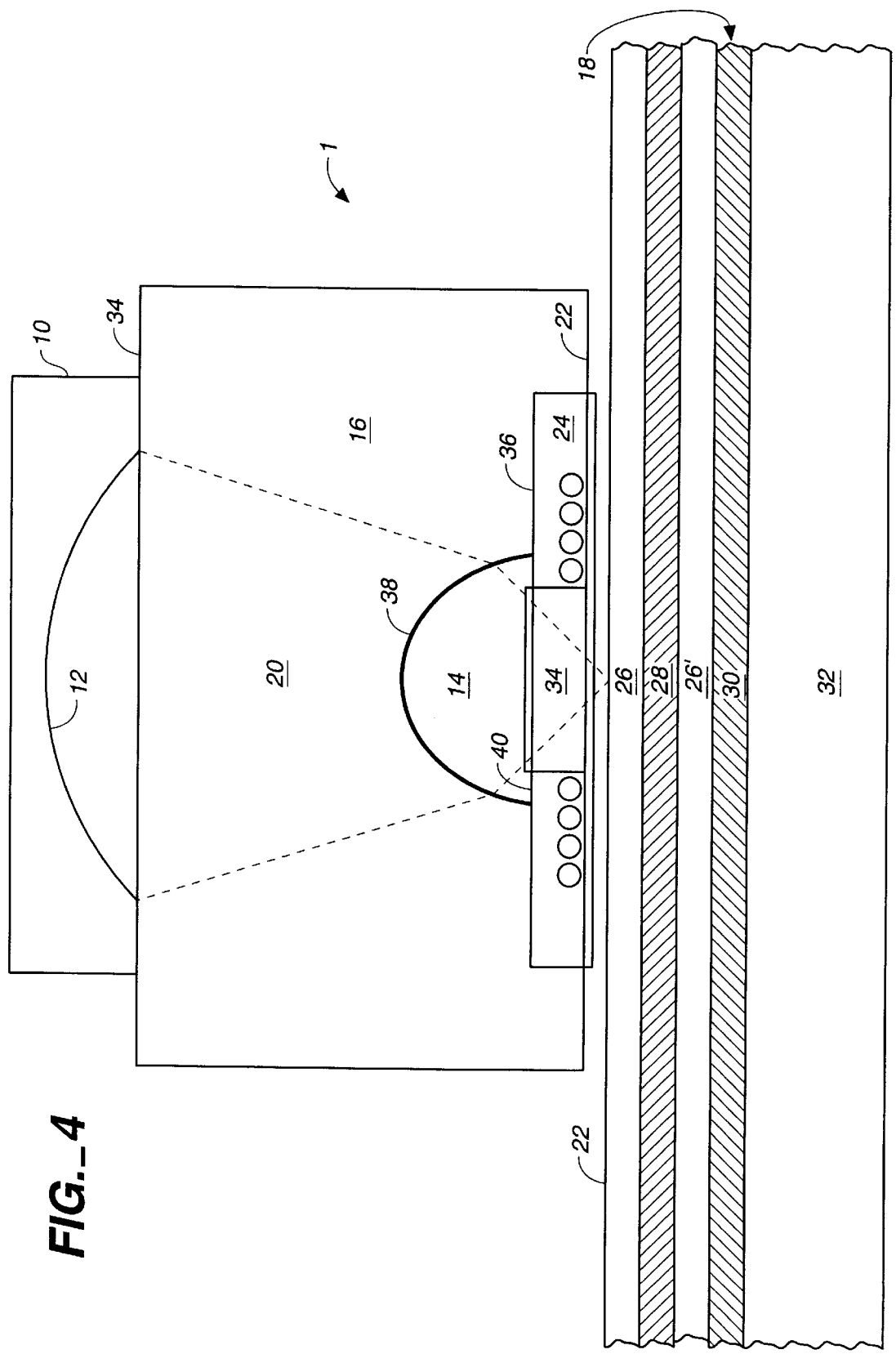

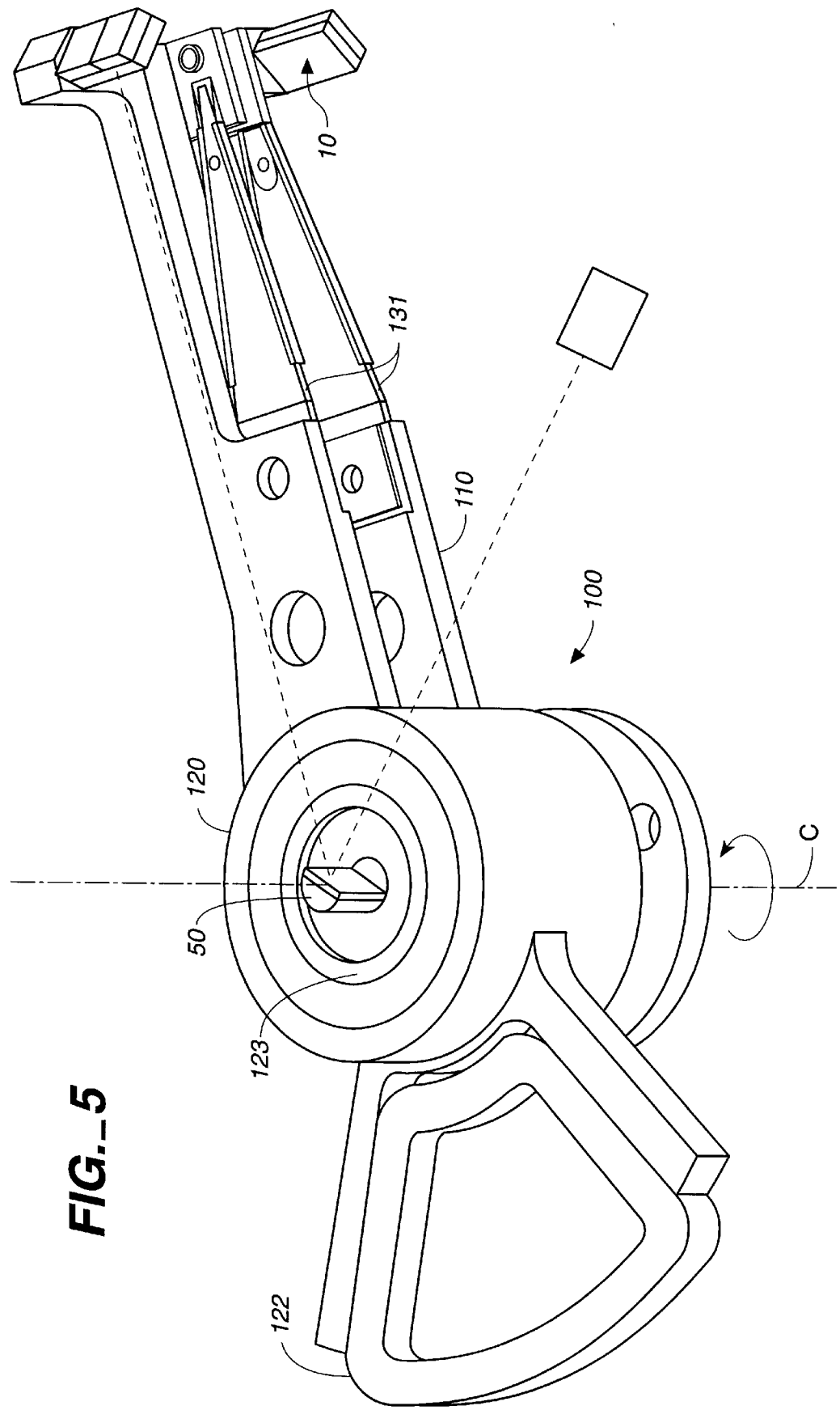

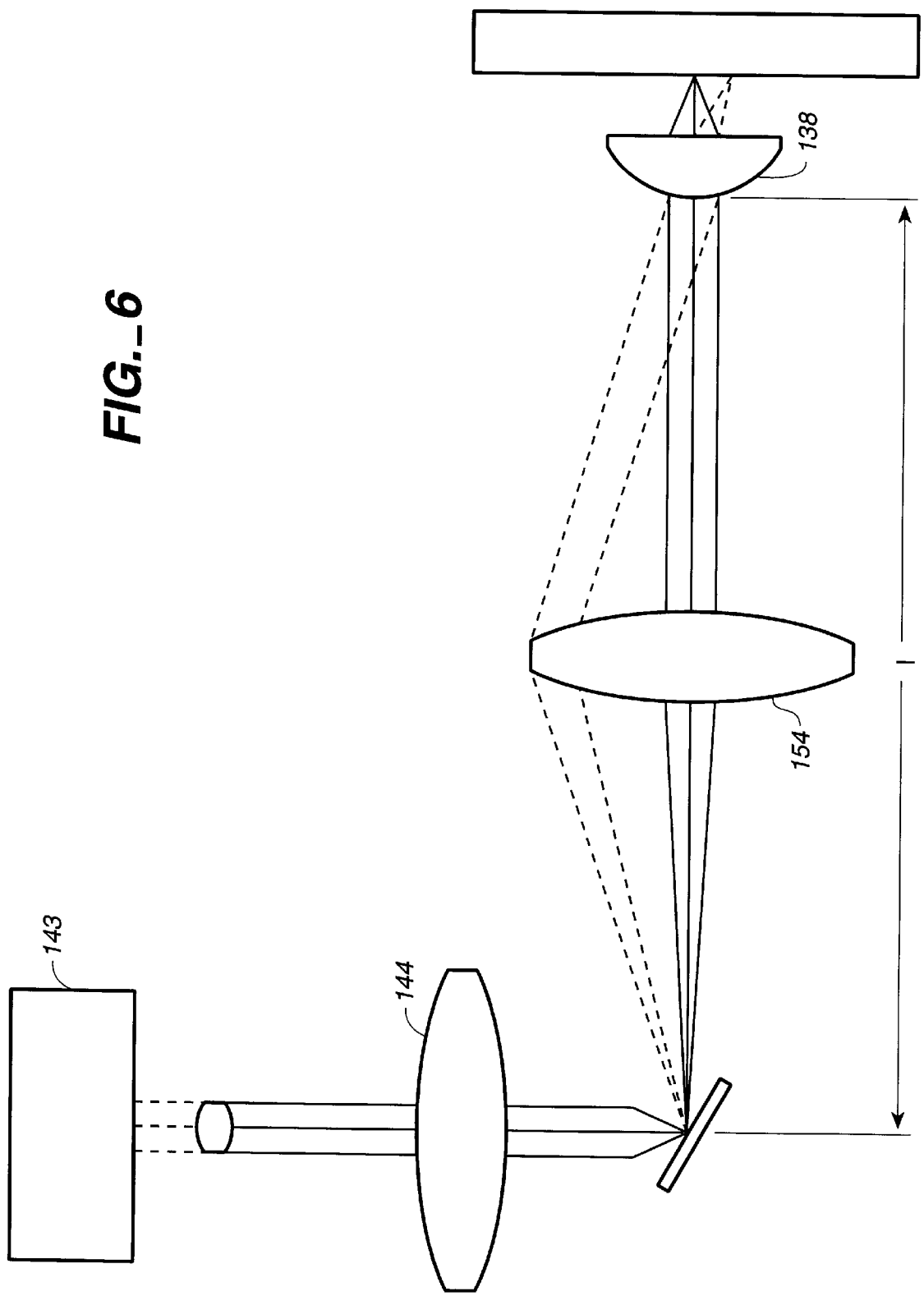
FIG._6

FLYING HEAD WITH SOLID IMMERSION LENS PARTIALLY MOUNTED ON A SLIDER

This is a continuation of application Ser. No. 08/641,513, filed May 1, 1996, now abandoned.

BACKGROUND

The present invention relates generally to heads for optical recording media, and more particularly to flying heads for disk drives having solid immersion lenses.

Optical data storage systems are of great commercial and academic interest because of their potential for very high data density. Unlike magnetic recording where data density may be limited by particle size, the density of optical recording may be limited by the diffraction limit of the illuminating light. In practice, the data density is in part also limited by how small illuminating radiation such as a laser beam can be focussed to on the disk.

To reduce the laser spot diameter, several methods can be employed. Higher frequency light may help matters because it has a smaller wavelength. Alternatively, increasing the numerical aperture of the lens may also help to decrease spot size.

An object of the invention is to provide an optical recording system in which a solid immersion lens (SIL) is used for optimum data densities. Another object of the present invention is to provide a flying head with an integral objective lens, solid immersion lens, and slider system so that the flying head may be maintained in focus, thus eliminating the need for a separate active focussing mechanism.

Additional objects and advantages of the invention will be set forth in the description which follows, and in part will be obvious from the description, or may be learned by practice of the invention. The objects and advantages of the invention may be realized and obtained by means of the instrumentalities and combination particularly pointed out in the claims.

SUMMARY OF THE INVENTION

The present invention is directed to a head for a disk drive for reading data from an optical recording medium having a slider with a top surface, a channel surface, and an air-bearing surface. The slider has an optical clear path through its body and a solid immersion lens mounted at least partially within. The solid immersion lens has a partial spherical surface and a flat portion. The flat portion may be a flat surface of the partial sphere or a flat plate. An objective lens can be mounted to the slider. The partial spherical surface of the solid immersion lens faces the objective lens and the distance between the air-bearing surface and the objective lens is constant.

The objective lens can be a micro-focussing objective. An optical clear path within the slider passes electromagnetic radiation back and forth from this objective lens to the spherical surface of the solid immersion lens. This radiation is focussed on or near the flat surface of the solid immersion lens and can be evanescently coupled to the optical recording medium. The flat surface of the solid immersion lens can be co-planar with or in the vicinity of the air-bearing surface.

The invention can operate in the near-field regime, such that the distance between a top surface of the optical recording medium and the air-bearing surface is less than one wavelength of the incident light.

The SIL may have the shape of a hemisphere or super-hemisphere. In the latter case, the thickness of the super-hemisphere may be less than or about r+r/n, where r is the radius of the partial spherical section and n is the index of refraction of the constituent material of the super-hemisphere.

In an alternative embodiment, the solid immersion lens may have the shape of a partial sphere of lesser thickness than that above, such that the sum of the thickness of the partial sphere plus the remainder of the optical path in the slider below the SIL is up to r+r/n. In the same way, where the solid immersion lens is a hemisphere, the sum of the thickness of the partial sphere plus the remainder of the optical path in the slider below the SIL is equal to r.

The flying head may be used to write data to a magneto-optical recording medium using a magnetic field. In this case, the head includes a coil located generally in the vicinity of the channel surface of the slider. The coil may be a micro-coil, or may be fabricated on a printed micro-circuit. The coil is fabricated generally adjacent to the central flat surface of the solid immersion lens and can be integrated into the slider.

A power supply supplies current to the coil. This current produces a magnetic field of strength between 50 and 300 oersteds, although other fields may also be generated. This magnetic field can be perpendicular to the surface of the optical recording medium. The field may be switched to a different direction at rates greater than 20 megabits per second.

The coil generally defines an opening in its center such that electromagnetic radiation traveling in the optical clear path can pass through the opening. The opening can be elongated in a cross-track dimension.

The optical recording medium may be a magneto-optical material deposited on a media substrate. Between the magneto-optical material and the media substrate is often located a reflector layer. Such a layer may be made of a material such as aluminum. On the side of the magneto-optical material opposite the media substrate may be located a transparent dielectric such as silicon nitride for protection of the optical recording medium. The media substrate can be, e.g., plastic, glass, or aluminum. The optical recording material can also be of a phase-change type. In this case a coil is not required. If the optical medium is a read-only disk, a selectively reflective material which may be located on a media substrate can be used, and the same can be covered with a transparent dielectric for protection.

A fine tracking actuator for guiding an optical beam can be employed, such as a galvanometer. This fine actuator is generally located close to the flying head, or can be imaged in the vicinity of the front focal point of the objective lens.

A rotary or linear coarse actuator on which is mounted the slider can be used for coarsely accessing any track on the optical recording medium.

A reflector such as a mirror or prism mounted on the slider above the objective lens can also be provided for guiding a laser beam into the objective lens on the slider. Alternatively, the same reflector may be mounted on an arm tied to the coarse actuator located above the objective lens.

The numerical aperture of the objective lens may be between 0.45 and 1.0, the index of refraction of the solid immersion lens may be between 1.4 and 2.5, the mass of the objective lens may be less than about 35 milligrams, and the radius of the spherical portion of the solid immersion lens may be less than about 2 millimeters.

Finally, collimating optics may be used to guide a laser beam towards the reflector and into the objective lens.

BRIEF DESCRIPTION OF THE DRAWINGS

The accompanying drawings, which are incorporated in and constitute a part of the specification, schematically illustrate the invention and, together with the general description given above and the detailed description given below, serve to explain the principles of the invention.

FIG. 1 is a sectional view of an optical head according to the present invention using a super-hemispherical SIL. The optical head is shown located above an optical recording medium.

FIG. 2 is a sectional view of the optical head according to the present invention using a hemispherical SIL, again shown above an optical recording medium.

FIG. 3 is a bottom view of the optical head of either FIG. 1 or FIG. 2.

FIG. 4 is a side sectional view of a slider incorporating an optical head according to the invention. This embodiment includes a magnetic coil for writing data magnetically to a recording medium. An optical recording medium structure is also shown.

FIG. 5 is a perspective view of a rotary actuator which can be used with the present invention.

FIG. 6 is a diagram of an example of collimating optics which can be used with the present invention.

FIG. 7 is a bottom view of a printed circuit coil surrounding an aperture which can be used in the present invention.

DESCRIPTION OF THE PREFERRED EMBODIMENTS

FIG. 1 is a diagram of an embodiment of the invention. A head 1 is shown located generally adjacent a disk 18, as in a disk drive. Disk 18 is also referred to herein as an optical recording medium. In this position, head 1 may be reading data from or writing data to disk 18.

Head 1 is shown as having constituent optics together with slider 16. The constituent optics are described below. Slider 16 has a top surface 34 and a channel surface 36. Slider 16 also has air-bearing surfaces 22. These air-bearing surfaces 22 can be designed to ride at a predetermined height above the disk 18 while disk 18 is rotating at a specific speed. By virtue of being carried by the air-bearing surfaces 22, head 1 can also ride at a predetermined height.

The distance between head 1 and disk 18 can be quite small. Head 1 can operate in the "near-field" regime, where "near-field" is often used to refer to the situation where the spacing between the head 1 and the disk 18 is less than the wavelength of the illuminating radiation and also where the numerical aperture of the entire lens system is greater than unity.

The constituent optics may include a reflector 10, an objective lens 12, and a solid immersion lens (SIL) 14. Each of these may be mounted to the slider 16. SIL 14 can be substantially or entirely contained within the slider 16. Objective lens 12 is mounted onto or near the top surface 34 of the slider 16 to focus the incident electromagnetic radiation, such as a laser beam, onto the SIL 14. An optical clear path 20 is provided between SIL 14 and objective lens 12 so that the electromagnetic radiation such as a laser beam may be effectively transmitted from one to the other and back again.

Between the objective lens 12 and the SIL 14 can be an optical clear path 20. This optical clear path 20 is constituted of any optically transparent material, and may be air, glass, optically clear plastic, and so on.

The electromagnetic radiation travelling through the optical clear path 20 can be incident on the partial spherical surface 38 of the SIL 14. The SIL can be a single glass partial sphere or a lesser portion of a partial sphere plus a glass flat. The SIL 14 generally has a spherical surface 38 surrounding the partial spherical portion and a flat portion 40, which may be a surface or a flat plate. These latter two surfaces may be entirely contained within the body of the slider 16. The flat portion 40 may be generally co-planar with or in the vicinity of the air-bearing surface 22. Such geometry can assist the flight of the head over the disk, and forms part of the total slider air bearing surface.

At least two versions of the SIL may be used in the present invention. An embodiment using a super-hemispherical SIL 14 is shown in FIG. 1, and an embodiment using a hemispherical SIL is shown in FIG. 2.

The hemispherical SIL 14' is shaped as a hemisphere and has a flat portion 40' which can wholly contain at least one diameter of the partial spherical section. The super-hemispherical SIL 14, on the other hand, as shown in FIG. 1, is a truncated sphere. The flat surface of the super-hemispherical SIL 14 contains no complete diameters of the spherical section (although it may intersect at least one diameter at one point). Because this constitutes a hemisphere plus a "zone of a sphere", where the latter is defined as the portion of a sphere contained between two parallel planes both intersecting the sphere, it is termed a "super-hemisphere".

The SIL 14 or 14' focusses the laser beam in the near vicinity of flat portion 40 or 40'. For convenience, we discuss the unprimed elements, although the same statements may be made for the primed. The converging rays from the objective lens 12 enter the partial spherical surface 38 of the SIL 14. Placement of the SIL 14 in the system then can focus the spot in proximity to the flat bottom portion 40 of the SIL 14. This is because the incoming converging rays from the objective lens 12 are refracted at the surface 38 of the partial spherical lens section, which can result in an increased effective incident angle. This then can result in an increase in the effective numerical aperture. In a hemispherical SIL, the increased effective numerical aperture can rise with n. In a super-hemispherical SIL, the increased effective numerical aperture can rise as $n^2$.

The focussed beam thus converges near the flat portion 40 of the SIL 14. The disk 18 is located less than a wavelength away from the flat portion 40 of the SIL 14 in the near-field situation. In this way, evanescent waves may couple the small spot near or on portion 40 to the disk 18. These evanescent waves generally extend a distance less than a wavelength from the flat portion of the SIL 14 before being significantly attenuated. In the case where the near-field situation is not used, i.e. where the total numerical aperture is less than unity, the disk may be further from the flat surface of the SIL.

Because the objective lens 12, optical clear path 20, and SIL 14 can all be mounted to slider 16, they can be stationary with respect to one another. Therefore, a beam which is focussed can be so maintained so long as the distance between the SIL 14 (or any other component of the head 1) and the disk 18 is maintained constant. This last condition may be met if the disk is rotating at operating speed and the air-bearing surfaces 22 are functioning properly. Therefore, there is no need for active focussing, as a proper focus can be maintained automatically because of the geometry of the system.

Occasionally it is desired to tilt the properly focussed beam to one side or the other in order to write to or read from a track adjacent to the one directly under the untilted beam. This tilting of the beam can be performed by a turning mirror such as a galvanometer. The tilted beam can pass unhindered to the disk through the objective lens and the SIL. There is also occasionally the need to better guide the laser beam into the objective lens 12 on the slider 16. To accomplish this, a reflector 10 may be located above the objective lens 12, but still on the slider, to guide the beam into the objective lens. This reflector 10 may be, e.g., a mirror or prism. The reflector may alternatively be mounted on an arm tied to the coarse actuator, as shown in FIG. 5 as element 10.

The system described above can be used to read data from an optical disk and to write data to a phase-change type or similar writable disk.

Alternatively, data may be written to a magneto-optical disk by also employing a separate magnetic field. In another embodiment of the invention, as shown in FIG. 4, a magnetic coil 24 is employed to create a magnetic field for interaction with the optical recording medium. This coil 24 can be co-axial with the SIL 14. In this case, the strongest point of the vertical magnetic field can be nearly coincident with the focussed beam on the recording medium. Like the SIL 14, this coil 24 can be integrated into the body of the slider 16.

Mesa 34 may be employed to serve as the lower section of SIL 14 as shown in FIG. 4. Mesa 34 allows for the removal of part of the SIL. As the refracted light does not extensively use the lower periphery of SIL 14, there is less need for the lower periphery of the SIL. By removing it, more room can be gained for the placement of coil 24.

Mesa 34 can be grown using known techniques onto SIL 14. Alternatively, the area around mesa 34 can be etched or mechanically removed. Mesa 34 can be integral and constituted of the same material as SIL 14.

The magnetic coil 24 can be current-driven by an appropriate power supply to create a vertical field approximately perpendicular to the plane of the coil 24. This magnetic field can be switchable to write data. Rates up to and much greater than 20 megabits per second can be used. The field can have a magnitude of about 50 to about 300 oersteds, although other fields could also be accommodated.

For convenience in a particular setup, the coil may be located away from the flat portion 40 of the SIL 14 to reduce the total air bearing surface of the slider. In another implementation, the plane of the coil 24 may be perpendicular to the plane of the disk 18. In this case, a device such as a permanent magnet or an electromagnet of proper geometry may be used to steer the field around a 90° angle so that it again can couple to the disk.

An alternative embodiment in which the coil is a printed micro-circuit coil 254 is illustrated in FIG. 7. In this case, the focussed light beam from the objective lens/SIL combination can exit through the clear operture 252.

Because such a coil can circle the base of the SIL 14, its center opening generally allows for the focussed laser beam to pass through. The shape of the coil and its opening may be elongated in one direction, as shown in FIG. 3 and described above, to allow a beam to tilt in an unhindered manner in the tracking dimension on the optical disk medium. In this way, the coil 24 may be as close as possible to the mesa 34 without interfering with the beam path.

Referring to FIG. 4, the optical recording medium can be a magneto-optical material 28 or a phase-change type material deposited on a media substrate. The magneto-optical material may be a rare earth—transition metal compound. Examples of suitable such magneto-optical materials are TbFeCo.

To increase the signal, a reflector layer made of a material such as aluminum can be placed between the magneto-optical material and the media substrate.

For protection of the magneto-optical material, on the side of the magneto-optical material opposite the media substrate can be located a transparent dielectric material 26 such as silicon nitride. The media substrate can be plastic, glass, or aluminum.

If optical reading only is desired, such as for a read-only disk, a selectively reflective material 30 located on a media substrate 32 can be used. This may also be covered with a transparent dielectric layer 26' for protection. For example, the selectively reflective layer can be composed of a number of pits or other non-reflective spots which serve to modulate the reflected light and thus read-back information.

The constituent optics can vary, although objective lens 12 can have a micro-focussing feature and an individual numerical aperture of 0.45 to 1.0. It may be made of, among other materials, glass or plastic. It has a mass typically of less than 35 milligrams.

The partial spherical portion of either the hemisphere or super-hemisphere can have a radius of less than or about 2 millimeters. The SIL material's index of refraction can be in the range of 1.4 to 2.5.

In the case of a super-hemispherical SIL 14, the total thickness thereof can be up to $r+r/n$, where r is the radius of the partial spherical section and n is the index of refraction of the constituent material of the super-hemisphere. If a thickness of less than $r+r/n$ is used, the SIL 14 may still be used. In this case, the amount by which the thickness is less than $r+r/n$ can be made up by an equivalent optical distance of an optical flat plate in the slider 16 or a top dielectric coating on the optical recording medium, or both. The same is true in the case of a hemispherical SIL 14'.

A separate fine tracking actuator for guiding an optical beam may be used, such as a galvanometer, as shown in FIG. 5 as actuator mirror 50.

For larger translations, a linear or rotary coarse actuator as shown in FIG. 5 as element 100 may be used, on which can be mounted the slider 16. A rotary coarse actuator as shown includes a coil 122, a rotary motor 120 and 123, the arm 110 and the flexure 131. This coarse actuator may then be used for accessing any track on the optical recording medium.

Collimating optics may be used to steer a laser beam towards the reflector 10 in those situations where a reflector 10 is employed. Such collimating optics are also shown in FIG. 6, and generally include such elements as laser collimator pen 143, collimating/corrections lens 144, imaging lens 154, and objective/SIL lens 138.

In summary, an optical flying head with an integrated solid immersion lens has been described.

The present invention has been described in terms of preferred embodiments. The invention, however, is not limited to the embodiment depicted and described. For example, variations in materials (and therefore variations in indices of refraction) of the optical components may be used, as well as certain variations in their optical parameters such as focal length and numerical aperture. Moreover, the invention may be used in a number of types of optical recording and playback.

Therefore, the scope of invention is defined by the appended claims.

What is claimed is:

1. A head for a disk drive for at least reading data from an optical recording medium, comprising:

a slider having a top surface, a channel surface, and an air-bearing surface;

an optical clear path through said slider;

a solid immersion lens mounted at least partially within said slider, said solid immersion lens having a partial spherical surface and a substantially flat portion;

an objective lens mounted to said slider, such that said partial spherical surface of said solid immersion lens faces said objective lens and the distance between said air-bearing surface and said objective lens is substantially constant.

2. The head of claim 1, wherein said objective lens is a micro-focussing objective.

3. The head of claim 1, wherein said optical clear path passes electromagnetic radiation back and forth from said objective lens through said spherical surface of said solid immersion lens to said flat portion of said solid immersion lens.

4. The head of claim 1, wherein said flat portion of said solid immersion lens is substantially co-planar with said air-bearing surface.

5. The head of claim 1, wherein said flat portion of said solid immersion lens is a flat surface.

6. The head of claim 1, wherein said flat portion of said solid immersion lens is a flat plate.

7. The head of claim 1, wherein the distance between a top surface of said optical recording medium and said air-bearing surface is less than one wavelength of light.

8. The head of claim 1, wherein said solid immersion lens has the shape of a hemisphere.

9. The head of claim 1, further comprising a separate fine tracking actuator for guiding an optical beam.

10. The head of claim 9, wherein said separate fine tracking actuator is located at an exit aperture of said solid immersion lens.

11. The head of claim 9, wherein said separate fine tracking actuator is a galvanometer.

12. The head of claim 1, further including a rotary or linear coarse actuator on which is mounted said slider for accessing any track on said optical recording medium.

13. The head of claim 12, further comprising a reflector mounted on an arm tied to said coarse actuator, said reflector located above said objective lens for guiding a laser beam into the objective lens on said slider.

14. The head of claim 1, further comprising a reflector mounted on said slider above said objective lens for guiding a laser beam into the objective lens on said slider.

15. The head of claim 14, wherein said reflector is selected from a group consisting of a mirror or a prism.

16. The head of claim 14, further comprising collimating optics to steer a laser beam towards said reflector.

17. The head of claim 1, wherein the numerical aperture of said objective lens is between about 0.45 and 1.0.

18. The head of claim 1, wherein the index of refraction of said solid immersion lens is between 1.4 and 2.5.

19. The head of claim 1, wherein the mass of said objective lens is less than about 35 milligrams.

20. The head of claim 1, wherein the radius of the spherical portion of said solid immersion lens is less than about 2 millimeters.

21. The head of claim 1, wherein said optical recording medium is of a phase-change type.

22. The head of claim 1, wherein said optical recording medium is a read-only disk having a selectively reflective material located on a media substrate.

23. A head for a disk drive for reading and writing data from an optical recording medium, comprising:

a slider having a top surface, a channel surface, and an air-bearing surface;

an optical clear path through said slider;

a solid immersion lens mounted at least partially within said slider, said solid immersion lens having a partial spherical surface and a substantially flat portion;

an objective lens mounted to said slider, such that said partial spherical surface of said solid immersion lens faces said objective lens and the distance between said air-bearing surface and said objective lens is substantially constant, a coil located generally adjacent said channel surface of said slider, said coil creating a magnetic field substantially perpendicular to the surface of said optical recording medium.

24. The head of claim 23, wherein said optical recording medium is a magneto-optical material deposited on a media substrate.

25. The head of claim 24, wherein on the side of said magneto-optical material opposite said media substrate is located a transparent dielectric material.

26. The head of claim 25, wherein said transparent dielectric is silicon nitride.

27. The head of claim 24, wherein said media substrate is one of the group consisting of plastic, glass, or aluminum.

28. The head of claim 27, wherein on the side of said reflective material opposite said media substrate is located a transparent dielectric.

29. The head of claim 28, wherein said transparent dielectric is silicon nitride.

30. The head of claim 24, wherein between said magneto-optical material and said media substrate is located a reflector layer.

31. The head of claim 30, wherein said reflector layer is aluminum.

32. The head of claim 23, wherein the direction of said magnetic field is switchable to the opposite direction.

33. The head of claim 32, wherein said direction may be switched at a rate greater than 10 megabits per second.

34. The head of claim 23, wherein said coil defines an opening generally in the center of the coil such that electromagnetic radiation traveling in said optical clear path passes through said opening.

35. The head of claim 34, wherein said opening is elongated in a cross-track dimension.

36. A head for a disk drive for at least reading data from an optical recording medium, comprising:

a slider having a top surface, a channel surface, and an air-bearing surface;

an optical clear path through said slider;

a solid immersion lens mounted at least partially within said slider, said solid immersion lens having a partial spherical surface and a substantially flat portion;

an objective lens mounted to said slider, such that said partial spherical surface of said solid immersion lens faces said objective lens and the distance between said air-bearing surface and said objective lens is substantially constant, wherein said solid immersion lens has the shape of a super-hemisphere, such that the thickness of said super-hemisphere is up to about r+r/n, where r is the radius of the partial spherical section and n is the index of refraction of the constituent material of the super-hemisphere.

37. A head for a disk drive for at least reading data from an optical recording medium, comprising:

a slider having a top surface, a channel surface, and an air-bearing surface;

an optical clear path through said slider;

a solid immersion lens mounted at least partially within said slider, said solid immersion lens having a partial spherical surface and a substantially flat portion;

an objective lens mounted to said slider, such that said partial spherical surface of said solid immersion lens faces said objective lens and the distance between said air-bearing surface and said objective lens is substantially constant, wherein the head is also used to write data to an optical recording medium, further including a coil located generally adjacent said channel surface of said slider.

38. The head of claim 37, wherein said coil is a microcoil.

39. The head of claim 37, wherein said coil is fabricated on a printed micro-circuit.

40. The head of claim 37, wherein said coil is fabricated generally adjacent said flat surface of said solid immersion lens.

41. The head of claim 37, wherein said coil is integrated into said slider.

42. The head of claim 37, further including a power supply to supply power to said coil, such that said coil produces a vertical magnetic field.

43. The head of claim 42, wherein said magnetic field has strength between about 50 and 300 oersteds.

44. A head for a disk drive for at least reading data from an optical recording medium, comprising:

a slider having a top surface, a channel surface, and an air-bearing surface;

an optical clear path through said slider;

a solid immersion lens mounted at least partially within said slider, said solid immersion lens having a partial spherical surface and a substantially flat portion;

an objective lens mounted to said slider, such that said partial spherical surface of said solid immersion lens faces said objective lens and the distance between said air-bearing surface and said objective lens is substantially constant, such that the effective numerical aperture of the objective lens—solid immersion lens system is less than one.

45. A head for a disk drive for at least reading data from an optical recording medium, comprising:

a slider having a top surface, a channel surface, and an air-bearing surface;

an optical clear path through said slider;

a solid immersion lens mounted at least partially within said slider, said solid immersion lens having a partial spherical surface and a substantially flat portion;

an objective lens mounted to said slider, such that said partial spherical surface of said solid immersion lens faces said objective lens and the distance between said air-bearing surface and said objective lens is substantially constant, such that the effective numerical aperture of the objective lens—solid immersion lens system is greater than one.

\* \* \* \* \*